Patented Apr. 1, 1924.

1,489,181

UNITED STATES PATENT OFFICE.

EDMUND WEIDNER, OF BERLIN, GERMANY.

PROCESS FOR THE PRODUCTION OF ALBUMOSE SOLUTIONS.

No Drawing.    Application filed June 10, 1922.    Serial No. 567,436.

*To all whom it may concern:*

Be it known that I, Dr. EDMUND WEIDNER, citizen of Germany, residing at Berlin, in Prussia, Germany, have invented new and useful Improvements in a Process for the Production of Albumose Solutions, of which the following is a specification.

This invention relates to a process for the production of lasting solutions of primary decomposition products of albuminous substances, which decomposition products are known as albumoses, by alkaline hydrolysis. In the hydrolyzing of keratin and other albuminous substances by means of alkali the decomposition of the keratin or albumin molecule does not stop when the primary decomposition products, the albumoses, are formed, but these primary products are decomposed further on by the action of the alkali. If the alkaline solutions of keratin or other albuminous substance are neutralized or acidulated with dissociated acids, especially with mineral acids, then the said decomposition products are precipitated. It is therefore not possible to maintain the primarily hydrolyzed albuminous substances, i. e. the albumoses, constant in alkaline solution and to utilize such solutions in this state.

Now I have found however that it is possible to produce lasting solutions of the primary decomposition products of keratin or other albuminous substances if, instead of mineral acids and the like, free fatty acid with three or more carbon atoms is added to the freshly prepared alkaline solution of proteins and the like, in equimolecular quantity to the alkali employed or even in excess. Examples of such fatty acids which may be used for this purpose are: ricinoleic acid, palmitic acid and oleic acid.

A substance is preferably added which is adapted to restrain the dissociation of the alkaline salts of the fatty acids, such as for instance alcohol, salt (sodium chloride) or acetone. The addition of such a substance is required specially for the reason that the alkaline salt of the fatty acid produced in the reaction remains permanent in the solution so that, without addition of a substance restraining the dissociation of the said salt, there would always be the danger of a further decomposition of the albumose in the solution. Owing to the addition of this substance which restrains the dissociation however the albumose solution is permanent notwithstanding the presence of the alkaline salt of a fatty acid.

Instead of the free fatty acid an equivalent fat, which must be easily saponifiable preferably in the cold, as for instance cocoa fat or a mixture of such fat and of free fatty acid, can be used.

The albumose solutions prepared in the manner indicated above can be used either as they are, specially for therapeutic purposes, or admixed with other substances, specially for the production of nutritive means.

*Example.*

300 grams of finely distributed keratin are heated at 95 to 98° cent. for 5 to 10 minutes with a solution of 400 grams of caustic potash (KOH) in 7800 ccm. of water and 200 grams of ammonia liquor of 0.96 specific gravity. Then 6 kilos of a mixture of equal parts of alcohol, having 95% contents, and ricinoleic acid are added. The reaction liquid may stand for about 2 days and is then filtered.

Having now particularly described and ascertained the nature of my said invention, I declare that what I claim is:—

1. A process for the production of lasting albumose solutions by alkaline hydrolysis of albuminous bodies consisting in firstly treating albuminous bodies with free alkali and hereafter adding to the formed solution such bodies containing higher fatty acids, that are able to bind the free alkali present.

2. A process for the production of lasting albumose solutions by alkaline hydrolysis of albuminous bodies consisting in firstly treating albuminous bodies with a solution of free alkali and then adding to the formed solution such bodies containing higher fatty acids which are able to neutralize the free alkali present and a substance adapted to restrain the dissociation of the formed alkaline salts of fatty acids in the solution.

3. A process for the production of lasting albumose solutions by alkaline hydrolysis of albuminous bodies consisting in firstly treating albuminous bodies with a solution of free alkali and then adding higher fatty acids and alcohol.

In testimony whereof I have hereunto set my hand in presence of two subscribing witnesses.

Dr. EDMUND WEIDNER.

Witnesses:
E. HOLTZERMAN,
CURT LIEBE.